United States Patent [19]

Hajek et al.

[11] Patent Number: 4,562,289
[45] Date of Patent: Dec. 31, 1985

[54] HOMOGENEOUS STORAGE STABLE CYANAMIDE SOLUTIONS IN POLYOLS AND A PROCESS FOR THEIR PRODUCTION

[75] Inventors: Manfred Hajek, Cologne; Hanns P. Müller, Odenthal; Werner Rasshofer, Cologne, all of Fed. Rep. of Germany

[73] Assignee: Bayer Aktiengesellschaft, Leverkusen, Fed. Rep. of Germany

[21] Appl. No.: 714,731

[22] Filed: Mar. 22, 1985

[30] Foreign Application Priority Data

Mar. 31, 1984 [DE] Fed. Rep. of Germany ....... 3412086

[51] Int. Cl.$^4$ ............................................ C07C 125/00
[52] U.S. Cl. ........................................ 564/2; 252/182; 564/106
[58] Field of Search ................... 564/2, 106; 521/163; 528/44; 252/182

[56] References Cited

U.S. PATENT DOCUMENTS

| 3,919,173 | 11/1975 | Cogner et al. ........................ 528/44 |
| 4,008,185 | 2/1977 | Olstowski . | |
| 4,101,506 | 7/1978 | Uhrhan et al. ............... 260/45.8 N |
| 4,258,141 | 3/1981 | Jarre et al. ......................... 521/114 |
| 4,310,449 | 1/1982 | Reischl et al. ...................... 521/163 |
| 4,324,716 | 4/1982 | Reischl et al. ...................... 521/163 |
| 4,507,456 | 3/1985 | Blum et al. ........................... 528/44 |

FOREIGN PATENT DOCUMENTS

| 004618 | 10/1979 | European Pat. Off. . |
| 2043917 | 3/1972 | Fed. Rep. of Germany . |
| 2348838 | 4/1975 | Fed. Rep. of Germany . |
| 2003124 | 11/1969 | France . |

Primary Examiner—Charles F. Warren
Assistant Examiner—R. A. Picard
Attorney, Agent, or Firm—Gene Harsh; Joseph C. Gil; Lyndanne M. Whalen

[57] ABSTRACT

Homogeneous storage stable solutions of cyanamide in a polyol are made by dehydrating a mixture of an aqueous cyanamide solution and at least one polyol under mild conditions. The aqueous cyanamide solution contains from 10 to 55 wt % cyanamide. The polyol may have a molecular weight of from 62 to 12,000. Polyether and/or polyester polyols having molecular weights from 400 to 12,000 are preferred. Mixtures of high and low molecular weight polyols which are not completely miscible with each other are also preferred. The dehydration is generally carried out at pressures less than 100 mbar and temperatures less than 130° C. The product solution has a cyanamide content of from 0.1 to 50 wt % and a residual water content which is generally no greater than 1 wt %. These homogeneous and storage stable cyanamide in polyol solutions are particularly useful in the production of polyurethanes.

20 Claims, No Drawings

HOMOGENEOUS STORAGE STABLE CYANAMIDE SOLUTIONS IN POLYOLS AND A PROCESS FOR THEIR PRODUCTION

BACKGROUND OF THE INVENTION

This invention relates to a process for the preparation of virtually oligomer-free, monophasically storage stable cyanamide solutions in polyols. The invention also relates to monophasically storage stable mixtures containing 0.1 to 50 wt % of monomeric cyanamide in a polyol or polyol mixture.

It is known to use nitrogen-containing compounds such as urea, cyanamide, dicyandiamide or melamine, as additives in polymers (e.g., polyurethane foams, particularly polyurethane flexible foams) to achieve improved flame resistance. See, for example, European Patent Application No. 4,618, German Offenlegungsschriften Nos. 2,348,838 and 2,043,917 and French Pat. No. 2,003,124.

One disadvantage of most nitrogen-containing flame retarding agents is the low solubility of these products in polyether polyols or polyester polyols. It is for this reason that they are normally used in the form of dispersions. Disadvantages of these dispersions include their low stability, their tendency to sedimentation and their high viscosity if their solids content is increased. These difficulties which create problems in continuous processes do not occur when pure, monomeric, solid cyanamide is used because monomeric cyanamide is readily soluble in polyols. However, pure, monomeric solid cyanamide is difficult to obtain technically and has low storage stability (di-/trimerization). Aqueous solutions of cyanamide are technically and economically obtainable but when aqueous cyanamide solutions are concentration by evaporation, oligomers which are difficultly soluble, relatively high molecular weight (e.g. dicyandiamide or higher homologues such as melamine) form. Monomeric cyanamide must therefore be extracted from this mixture with solvents such as ether. This extraction procedure is cost intensive.

SUMMARY OF THE INVENTION

It is an object of the present invention to provide storage stable homogeneous solutions of cyanamides in polyols.

It is also an object of the present invention to provide a process for the production of storage stable homogeneous solutions of cyanamides in polyols.

It is another object of the present invention to provide storage stable homogeneous solutions of cyanamides in polyols useful in the production of polyurethane foams and synthetic resins by the RIM process.

These and other objects which will be apparent to those skilled in the art are accomplished by dehydrating a mixture of aqueous cyanamide solution(s) and polyol(s) under mild conditions.

DETAILED DESCRIPTION OF THE INVENTION

A process for the preparation of storage stable cyanamide solutions in polyols, preferably based on relatively high molecular weight polyether or polyester polyols has now been found. Inexpensive aqueous cyanamide solutions may be used as the starting material. It is surprising that mixtures of aqueous cyanamide solutions and polyols may be dehydrated under mild conditions without the formation of difficultly soluble secondary products of cyanamide, such as dicyandiamide. The residual water content of such cyanamide solutions in polyol is astonishingly low, being less than 1%. Further, cyanamide solutions in some polyols have a surprisingly low viscosity at relatively high concentrations and in many cases, the viscosity of these solutions is even below the viscosity of the starting polyols (a feature which is particularly advantageous for mechanically dosing these polyol solutions).

It has also been found that not only is the stability of the monomeric cyanamide in the polyol solutions satisfactory but that cyanamide has a solubilizing effect on mixtures of polyols which are not homogenously miscible. For example, mixtures of relatively high molecular weight polyols and low molecular weight polyols which are not completely miscible with them (such as ethylene glycol and/or butane diol) are solubilized. It thereby becomes possible to obtain homogeneous, monophasic polyol mixtures which are more suitable than inhomogeneous, cloudy polyol mixtures for the production of polyurethanes.

The present invention thus relates to a process for the preparation of cyanamide solutions in polyols in which mixtures of aqueous cyanamide solutions preferably containing from 10 to 50 wt %, most preferably containing from 25 to 50 wt % of cyanamide and a polyol or more than one polyol having a molecular weight of from 62 to 12,000 are freed from water.

Preferred polyols are relatively high molecular weight polyols with molecular weights from 400 to 12,000, particularly relatively high molecular weight polyether and/or polyester polyols. Polyol mixtures of such relatively high molecular weight polyols and low molecular weight polyols having molecular weights from 62 to 399, particularly polyols which are not completely miscible with the high molecular weight polyol such as ethylene glycol and/or butane-1,4-diol are also preferred.

These mixtures are freed from water at pressures below 100 mbar, preferably below 50 mbar and most preferably below 30 mbar at low temperatures, preferably from 40° to 130° C. The quantities of aqueous cyanamide solution and polyol are chosen so that stable solutions of monomeric cyanamide in the polyols or polyol mixtures are obtained. The product solutions have a cyanamide content of from 0.1 to 50 wt % and preferably a residual water content $\leq 1$ wt %, more preferably $\leq 0.1$ wt %.

The aqueous cyanamide solutions containing from 10 to 55 wt %, preferably from 20 to 50 wt % of cyanamide include commercial aqueous cyanamide solutions which in most cases contain about 40 to 50 wt % of cyanamide and small quantities of known (acid) stabilizers (e.g. mono-/di-sodium phosphates or other acid derivatives of phosphoric acid).

The polyols used as starting materials are divalent and/or higher valent polyhydroxyl compounds having molecular weights of from 62 to 12,000 or mixtures thereof. These polyols include both relatively high molecular weight polyhydroxyl compounds having molecular weights of from 400 to 12,000 (preferably from 800 to 10,000, most preferably from 1,000 to 8,000) and/or low molecular weight polyhydroxyl compounds having molecular weights of from 62 to 399 (so called chain lengthening diols or cross linking polyols).

The relatively high molecular weight polyhydroxyl compounds may be polyether-, polyester-, (including polylactone ester- or polycarbonate-), polythioester-, polyacetal- or saturated or unsaturated hydrocarbon-polyols having 2 to 8 hydroxyl end groups as well as other hydroxyl-containing polymers known to be useful for the production of polyurethanes. The melting point of these polyols is generally below 60° C., preferably below 40° C., and most preferably they are liquid compounds at room temperature. Mixed types such as polyether esters, polyether acetals, polyester amides or the like may, of course, be used. So called prelengthened polyols already containing urethane or urea groups may also be used. Products of addition of alkylene oxides to phenol/formaldehyde resins or urea/formaldehyde resins may be used. It is preferred to use polyesters and polyethers, especially polyethers. Specific examples of suitable polyethers include tetramethylene oxide diols and copolymers thereof with ethylene oxide and/or propylene oxide, but especially polyoxyalkylene polyols based on alkyloxiranes (such as propylene oxide) which preferably also contain other alkylene oxides built into them (preferably oxyethylene segments).

Such polyoxyalkylene polyols may be prepared by addition of alkyloxiranes such as propylene oxide, epichlorohydrin, 1,2- or 2,3-butylene oxide and/or styrene oxide to divalent or higher valent starting compounds. Such starting compounds include water, di- or polyols, ammonia, amines, di- or polyamines, amino alcohols, hydrazine and similar compounds. Mixtures of alkyloxiranes, e.g. of propylene oxide and epichlorohydrin, may also be used for the preparation of the polyoxyalkylene polyols. It is preferred to use polyoxyalkylene polyols which contain at least 5 wt % and less than 80 wt % of polyoxyethylene segments situated predominantly or exclusively at the chain ends, and which therefore have at least some primary hydroxyl groups in end positions.

It is particularly preferred to use those polyoxyalkylene polyols or oxyethylene copolymers thereof which are synthesized from propylene oxide (i.e. polyoxypropylene glycols), optionally modified with oxyethylene segments. Among these compounds, it is preferred to use polyoxyalkylene polyols which contain oxyethylene blocks predominantly or, most preferably, exclusively in end positions. Such oxyethylene blocks constitute from 5 to 80 wt %, preferably 10 to 50 wt %, most preferably from 12.5 to 27.5 wt % of the polyol based on the sum of all the oxyalkylene units present in the polyoxyalkylene polyol. Homogeneous, storage stable monophasic mixtures may, however, surprisingly also be obtained from pure polyoxypropylene polyols and cyanamide and low molecular weight diols such as ethylene glycol.

The preparation and properties of such polyethers useful in the present invention are described in Ullmanns Encyclopedia der Technischen Chemie, Verlag Chemie, Weinheim, 4th Edition, Volume 19 (1981), in the chapter entitled "Polyalkylenglykole" (pages 31 to 38) and in the chapter "Polyurethane" (pages 301 to 341, in particular pages 304 to 308). They are also discussed in Kunststoff Handbuch, Volume VII, Polyurethane, Carl Hanser Verlag, Munich (1966), on pages 61 to 75 or ibid. 2nd Edition, (1983), pages 42 to 54 and 75 to 77.

The low molecular weight polyols which may be used in the present invention include compounds within the molecular weight range of from 62 to 399, preferably from 62 to 254, containing at least two hydroxyl groups. For the purpose of this invention, it is particularly preferred to use those low molecular weight polyols which are immiscible or for practical purposes insufficiently miscible in the high molecular weight polyols (particularly polyethers) without modification with salts.

Suitable low molecular weight polyols include diols or mixtures of diols, preferably straight chained or branched (cyclo) alkylene diols such as ethylene glycol, 1,2-propanediol, 1,3-propanediol, 3-chloro-1,2-propanediol, 1,4-butanediol, 1,4-dihydroxycyclohexane, 1,4-dihydroxy-methyl cyclohexane and 2-butene-1,4-diol; (cyclo) aliphatic triols such as glycerol, trimethylol ethane, 1,2,6-hexanetriol, trimethylolpropane and the propoxylation and ethoxylation products of these triols having molecular weights of up to 399; polyols such as bis- and trimethylol propane, penaethythritol and their mono- and oligoethoxylation products; also, the bis-propoxylation or bis-ethoxylation products of aromatic phenols, preferably of bis-(4-hydroxyphenyl)-dimethyl methane or hydroquinone. Formoses and formitols having molecular weights of up to 399 are also suitable polyols. Preferred examples of low molecular polyols include ethylene glycol and/or butane-1,4-diol, but ethylene glycol is the most important of these polyols.

The process of the present invention may be advantageously carried out by introducing a mixture of polyol (mixture) and cyanamide solution into an apparatus equipped with stirrer and distilling off the water at moderately elevated temperatures and reduced pressure with vigorous stirring. Dehydration is advantageously carried out at a pressure below 100 mbar, preferably below 50 mbar and especially at pressures below 30 mbar down to about 0.01 mbar and at temperatures below 85° C., (e.g. from 85°–35° C).

In one embodiment of this process, polyol is first introduced into the reaction vessel and the calculated quantity of aqueous cyanamide solution is then continuously added under suitable conditions of temperature and pressure during the distillation. This procedure is particularly suitable for mixtures which tend to foam when dewatered.

In another variation of the process of the present invention dehydration is carried out in a single stage or multi-stage thin layer evaporator. In this case, higher temperatures may be employed since the thermal stress is less by virtue of the shorter contact time with the hot zone. In this procedure, the step of dehydration may be carried out at temperatures of from 100° C. to about 130° C. It is also technically possible to carry out dehydration in a reaction coil as described, for example, in German Offenlegungsschrift No. 2,719,970.

In another embodiment of the process which is preferred for mixtures of relatively high molecular weight and low molecular weight polyols, dehydration of the aqueous cyanamide solutions is carried out in the relatively high molecular weight polyol(s) and the low molecular weight polyol (e.g. ethylene glycol, butane-1,4-diol or neopentyl glycol), is subsequently added to the cyanamide/polyol mixture. The possibility of low molecular weight polyols being removed with the water distilled off at the stage of dehydration is thereby avoided.

It must be regarded as surprising that cyanamide solutions in polyols can be prepared by this procedure without the troublesome formation of quantities of dicyandiamide in solid form. Highly concentrated, storage stable solutions with a residual water content below 1%, which in some cases (e.g. at high cyanamide concentrations of about 30 to 50%) have an even lower viscosity than the starting polyol are particularly valuable.

The process of the present invention yields monophasically stable solutions of monomeric cyanamide in polyols economically under mild reaction conditions. Homogeneous solutions result in better mechanical properties in polyurethanes than in homogeneous polyol mixtures.

The solutions of the present invention are homogeneous, monophasically storage stable solutions containing from 0.1 to 50 wt % of monomeric cyanamide (based on the solution) in polyols (preferably polyoxyalkylene polyols) and have $\leq 1$ wt % of water. Solutions in a mixture of relatively high molecular weight polyols (preferably polyoxyalkylene polyols) and low molecular weight polyols (preferably diols) are preferred. Cyanamide-containing polyol mixtures according to the invention in which the relatively high molecular weight polyols and the low molecular weight polyols are not completely compatible with each other (i.e. not miscible to form a clear mixture in all proportions) are also preferred. Particularly important polyol mixtures are those which contain polyoxyalkylene polyols and ethylene glycol and/or butane-1,4-diol. The polyols or polyol mixtures generally contain from 0.5 to 15 mol, preferably from 1 to 12 and in most cases from 1.5 to 8 mol of low molecular weight polyols per mol of higher molecular weight polyol. In many cases, cyanamide contents of from 0.1 to 10 wt % and in most cases even from 0.1 to 4.9 wt % in the polyols or polyol mixtures are sufficient to act as solubilizing agents for the incompletely miscible polyol components.

The homogeneous, monophasically storage stable solutions containing monomeric cyanamide obtained by the process of the invention are useful as polyol components for the production of polyurethane products. They are particularly useful for the production of PU (rigid) foams or cellular plastics with a non-cellular surface and optionally integral density distribution (produced, for example, by the RIM process).

In the production of polyurethane products, the polyol solutions of the present invention are used in a one-shot process, either as the only polyol component or with other, relatively high and/or low molecular weight polyol or polyamine components. The polyol component is reacted with polyisocyanate(s), optionally in the presence of other, isocyanate reactive components and optionally with conventional auxiliary agents and additives (e.g. catalysts, emulsifiers, foam stabilizers, mold release agents, blowing agents, dyes, pigments or fillers).

By virtue of their homogeneous, monophasic character, the solutions of polyols or polyol mixtures according to the invention can easily be conveyed through dosing apparatus, ensure a uniform reaction and result in improved mechanical characteristics as well as improved surface structures without any surface defects (so called "pin holes").

Since cyanamide obviously undergoes di- and trimerization at the high temperatures of polyurethane formation, it contributes to the increase in modulus and improvement in thermal characteristics of the polyurethane products. The cyanamide also facilitates removal from molds without producing any adverse effect due to migration or dissolving out.

The polyol solutions of this invention may also be reacted with diisocyanates at low temperatures (i.e. 50° to 70° C.) to form isocyanate prepolymers which may then be worked up with compounds containing reactive hydrogen atoms by methods known in the art, either alone or in admixture with other polyisocyanates, to produce polyurethane.

EXAMPLES

Having thus described the invention, the following Examples are given by way of illustration. The percentages given in these Examples are percentages by weight, unless otherwise indicated.

EXAMPLE 1

500 g of a copolymer of propylene oxide and ethylene oxide (82/78 mol %) which had been started on trimethylol propane, had an OH number of 34 and a viscosity of 900 mPas at 20° C. were introduced into a 4-necked flask equipped with high speed stirrer, descending condenser, dropping funnel and internal thermometer. 52 g of a 50% aqueous cyanamide solution were added. The cyanamide solution used (approximately 50% solution, SüddeutscheKalkstickstoffwerke Trostberg, Oberbayern) was stabilized with small quantities of acid substances. Water was then distilled off at a pressure of 15 mbar and a reaction temperature of 50° to 60° C. The reaction temperature was then raised to 75°–80° C. for 45 minutes. A 5% cyanamide solution in polyether polyol still containing 0.3% of water and having a viscosity of 2.200 mPas at 20° C. was thus obtained. The solution was still clear after it had been left to stand for one year and no insoluble di- or trimerization products separated.

EXAMPLE 2

A mixture of 500 g of the polyol used in Example 1 and 111 g of the 50% aqueous cyanamide solution used in Example 1 was dehydrated by the method described in Example 1. A 10% solution of the cyanamide in the polyol, still containing about 0.6% of water and having a viscosity at 20° C. of 4,000 mPas was obtained.

EXAMPLE 3

The method described in Example 1 was used to dehydrate a mixture of 500 g of the polyol of Example 1 and 177 g of the aqueous cyanamide solution of Example 1. A 15% solution of the cyanamide in the polyol having a residual water content of 0.6% and a viscosity of 5,000 mPas at 20° C. was obtained.

EXAMPLE 4

A mixture of 500 g of the polyol indicated in Example 1 and 250 g of the 50% aqueous cyanamide solution of Example 1 was dehydrated by the method described in Example 1. The 20% cyanamide solution obtained after concentration by evaporation contained 0.8 % of water and had a viscosity of 5,000 mPas.

EXAMPLE 5

A mixture of 500 g of the polyol of Example 1 and 333 g of the 50% aqueous cyanamide solution of Example 1 was dehydrated by the method described in Example 1. The 25% solution of cyanamide in a polyol obtained after dehydration still contained 0.7% of water and had a viscosity of 4,900 mPas at 20° C.

EXAMPLE 6

A mixture of 500 g of the polyol described in Example 1 and 1,000 g of the 50% cyanamide solution of Example 1 was dehydrated by the method described in Example 1 with the aqueous solution being added in 250 g portions at a reaction temperature of 60° C. and a pressure of 15 mbar. A 50% cyanamide solution having a residual water content of 0.9% and a viscosity of 250 mPas at 20° C. was obtained.

EXAMPLE 7

500 g of a propylene oxide which had been started on polypropylene glycol were introduced into the apparatus described in Example 1. This polypropylene oxide had an OH number of 56 and a viscosity of 360 mPas at 20° C. 110 g of the 50% cyanamide solution of Example 1 were added dropwise from a dropping funnel over a period of 2 hours at a reaction temperatuure of 60° to 65° C. and a pressure of 15 to 20 mbar. The pressure and temperature were then maintained constant until no more water distilled off. The reaction mixture was thereafter heated to 80° C. for 30 minutes. The 10% solution of cyanamide in polyol obtained had a viscosity of 2,000 mPas and a residual water content of 0.3%.

EXAMPLE 8

A mixture of 500 g of the polyol used in Example 7 and 333 g of the 50% cyanamide solution of Example 1 was dehydrated by the method described in Example 1. A 25% solution of cyanamide in polyol was obtained, having a residual water content of 0.3% and a viscosity of 2,500 mPas at 20° C.

EXAMPLE 9

A mixture of 500 g of a copolyether based on propylene oxide and ethylene oxide (87% PO/13% EO) which had been started on trimethylol propane and had an OH number of 35 and a viscosity of 820 mPas at 20° C. and 333 g of the 50% aqueous cyanamide solution of Example 1 was treated by the process described in Example 1.

A 25% cyanamide solution having a residual water content of 0.5% and a viscosity of 400 mPas at 20° C. was obtained.

EXAMPLE 10

A mixture of 333 g of the aqueous cyanamide solution of Example 1 and 500 g of a copolymer of ethylene oxide and propylene oxide (10/90 mol %) which had been started on a mixture of trimethylol propane and propylene oxide and had an OH number of 49 and a viscosity of 550 mPas (20° C.) was treated by the method described in Example 1.

A 25% solution of cyanamide in a polyol which still contained 0.6% of water and had a viscosity of 310 mPas at 20° C. was obtained.

EXAMPLE 11

A mixture of 333 g of the aqueous cyanamide solution of Example 1 and 500 g of a polypropylene ether which had been started on trimethylol propane and had an OH number of 56 and a viscosity of 480 mPas (20° C.) was passed 3 times through a laboratory thin layer evaporator 50 cm in length at a pressure of 12 mbar and a jacket temperature of 120° C. A 25% cyanamide solution in the above-mentioned polyol having a residual water content of 0.6% and a viscosity of 3,000 mPas (20° C.) was obtained.

EXAMPLE 12

A mixture of 333 g of the 50% aqueous cyanamide solution of Example 1 and 500 g of a polyether polyol based on a copolymer of ethylene oxide and propylene oxide (25% EO/75% PO) which had been started on trimethylol propane and had an OH number of 415 (molecular weight 405) and a viscosity of 12,000 mPas at 20° C. was treated by the process described in Example 1.

A 25% solution of cyanamide in the above-mentioned polyol which still contained 0.7% of water and had a viscosity of 700 mPas at 22° C. was obtained.

EXAMPLE 13

The procedure was the same as described in Example 12 except that the quantity of 50% aqueous cyanamide solution was increased so that a 35% solution of cyanamide in the polyether polyol was obtained. The product solution had a residual water content of 0.8% and a viscosity of 2,400 mPas (20° C.). (Stable in storage for several months).

EXAMPLE 14

A mixture of 250 g of the 50% aqueous cyanamide solution of Example 1 and 500 g of a polyether polyol based on propylene oxide, which had been started on cane sugar and water and had an OH number of 380 and a viscosity of 600 mPas (20° C.) was dehydrated in an apparatus as described in Example 1.

The water was distilled off down to a residue of 0.8% within 8 hours at a pressure of 10 to 15 mbar and a reaction temperature of 60° to 65° C. A 20% cyanamide solution in a polyether polyol having a viscosity of 700 mPas at 22° C. was obtained.

EXAMPLE 15

A mixture of 428 g of the 50% aqueous cyanamide solution of Example 1 and 500 g of the sugar-based polyether polyol used in Example 14 was treated by the method described in Example 14.

A 30% cyanamide solution containing only 0.7% of water and having a viscosity of 300 mPas at 22° C. was obtained.

EXAMPLE 16

A mixture of 666 g of the 50% aqueous cyanamide solution of Example 1 and 500 g of the sugar-based polyether polyol mentioned in Example 14 was treated by the process described in Example 14.

A 40% cyanamide solution in a polyether polyol which contained only 0.8% of water and had a viscosity of 270 mPas at 22° C. was obtained.

EXAMPLE 17

A mixture obtained by the portionwise addition of 1,000 g of the 50% aqueous cyanamide solution of Example 1 to 500 g of the polyol described in Example 14 was treated by the same method as described in Example 14. A 50% cyanamide solution in the polyether polyol having a residual water content of 0.7% and a viscosity of 200 mPas at 22° C. was obtained.

EXAMPLE 18

A mixture of 428 g of the 50% aqueous cyanamide solution described in Example 1 and 500 g of a polyether polyol based on a propylene oxide which had been started on propylene glycol and had an OH number of 515 and a viscosity of 95 mPas at 20° C. was dehydrated in an apparatus such as that described in Example 1.

The water was distilled off at temperatures from 50° to 65° C. and, in the final phase, at 70° C., and at a pressure of 10 to 15 mbar.

A 30% solution of cyanamide in the polyether polyol was obtained. This solution contained only 0.6% of water and had a viscosity of 75 mPas at 20° C.

EXAMPLE 19

The procedure was the same as that described in Example 18 except that 666 g of the 50% aqueous cyanamide solution were used. After concentration by evaporation, the 40% solution of cyanamide in polyol obtained had a water content of 0.6% and a viscosity of 45 mPas at 20° C.

EXAMPLE 20

250 g of the 50% aqueous cyanamide solution of Example 1 and 500 g of a solvent-free polyester polyol melt were introduced at 60° C. into the apparatus used in Example 1. The polyester which was based on adipic acid and 1,4-butanediol had an OH number of 56 and melted above 40° C.

The water was distilled off at temperatures from 50° to 65° C. and at a pressure of 15–20 mbar. In the final phase, the reaction temperature was raised to 70 or higher, up to a maximum of 75° C.

A 20% solution of cyanamide in the polyester polyol was obtained. This solution had a water content of only 0.4% and was solid at room temperature but readily melted at about 40° C.

EXAMPLE 21

Example 20 was repeated with the exception that 538 g of the 50% aqueous cyanamide solution were used. A 35% solution of cyanamide in the polyester polyol which contained only 0.16% of water and had a viscosity of 3,200 mPas at 22° C. was obtained.

EXAMPLE 22

A mixture of 500 g of glycerol and 250 g of the 50% aqueous cyanamide solution of Example 1 was dehydrated by the method described in Example 1.

A stable 20% cyanamide solution in glycerol which had a viscosity of 7,000 mPas at 20° C. and a residual water content of about 1% was obtained.

EXAMPLE 23

A mixture of 500 g of butane-1,4-diol and 250 g of the 50% aqueous cyanamide solution of Example 1 was dehydrated by the method described in Example 1. A stable 20% cyanamide solution in butanol having a residual water content of about 0.8% and a viscosity of 60 mPas at 20° C. was obtained.

EXAMPLE 24

Experiments to test the compatibility of cyanamide-polyol solutions and ethylene glycol (24a) 80 parts by weight of the cyanamide-polyol solution from Example 4 and 20 parts by weight of ethylene glycol yielded a homogeneous, monophasically storage stable (clear) mixture. The viscosity of the solution was 1,300 mPas/20° C.

(24b) 80 parts by weight of the cyanamide-polyol solution from Example 5 and 20 parts by weight of ethylene glycol were mixed to form a stable solution, viscosity 650 mPas/20° C., as in (25a).

(24c) A 4:1 mixture of the cyanamide-polyol solution from Example 8 and ethylene glycol was prepared as in Example (24a). A clear, stable solution with a viscosity of 600 mPas/20° C. was obtained.

(24d) A 4:1 mixture of the cyanamide-polyol solution from Example 9 and ethylene glycol was prepared as in Example (24a). A clear solution having a viscosity of 1,000 mPas/20° C. was obtained.

(24e) A 4:1 mixture was prepared as in Example (24a), using a cyanamide-polyol solution from Example 11. The stable solution had a viscosity of 820 mPas/20° C.

In each of the solutions produced in Examples (24a) through (24e), the polyols used as starting material (without cyanamide) were not clear and completely miscible with ethylene glycol in this ratio.

EXAMPLE 25

Use of the cyanamide-containing polyethers for the production of polyurethane foams

| A (Comparison) | B (according to the invention) | |
|---|---|---|
| 188 | 95 | parts of a polyether triol having an OH number of 27, which has been obtained by the addition of, firstly, 78% by weight of propylene oxide and then 22% by weight of ethylene oxide onto trimethylol propane, |
| — | 95 | parts of a 20% strength by weight solution of cyanamide in the above polyether |
| 47 | 47 | parts of ethylene glycol |
| 0,15 | 0,15 | parts of UL 1, a tin catalyst from the Witco Corp./USA |
| 1,1 | 1,1 | parts of diazabicyclo-octane (catalyst DABCO ®) |
| 20 | 20 | parts of trichlorofluoromethane |
| 272 | 296 | parts of an isocyanate having an NCO content of 24,5% by weight, which has been obtained by reacting a mixture of 83% of 4,4'-diisocyanatodiphenyl-methane, 7% of 2,4-diisocyanatodiphenylmethane and 10% of polyfunctional polyisocyanates of the diphenylmethane series (total NCO content 31,8%) with dipropylene glycol. |

The NCO-index in test A (comparative example, not according to the invention) is 100, and in test B it is 122 (based only on NCO/OH). The polyol components in A consist of two phases and in B of one phase.

The component are intensively mixed, with one another, mechanically, and the foamable reaction mixture is introduced into a closed steel mould which has the internal dimensions 20×20×1 (cm) and a temperature of 60° C. The release agent used is P 180 from the Acmos company in Bremen. Stirring time: 9 sec, moulding time: 5 min.

Results (mechanical values)

| | A | B |
|---|---|---|
| Gross density (kg/m$^3$) | 1020 | 1012 |
| Shore D hardness (DIN 53505) | 67 | 69–70 |
| Modulus of elasticity (ASTM-D 790) | | |
| Room temperature | 428 | 738 |
| Impact resistance (kJ/m$^2$) | not broken | 138,7 |
| Room temperature/DIN 53 448 | | |
| Tensile test (DIN 53 505) | | |

|  | A | B |
|---|---|---|
| Breaking elongation (%) | 23,8 | 42,3 |
| Tensile strength (MPa) | 14,3 | 21,4 |

Foams of a gross density of 600 were obtained in a similar manner but with the introduction of smaller quantities into the mould.

Fire behaviour

The fire behaviour of foams having a gross density of 600 was tested using test specimens measuring 12,7 cm×1,27 cm×1 cm. According to the instructions under UL 94 grade V 1 is achieved for the foam according to the invention and grade V 2 for the comparative example A.

The example shows that by the co-use of cyanamide, according to the invention, it is possible to achieve not only a desirable improvement in the mechanical properties of integral foam articles, but also an improvement in the fire behaviour.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a homogeneous storage stable cyanamide in polyol solution having a cyanamide content of from 0.1 to 50 wt % comprising dehydrating a mixture of
   (a) an aqueous cyanamide solution containing from 10 to 55 wt % of cyanamide and
   (b) at least one polyol having a molecular weight of from 62 to 12,000
at a pressure below 100 mbar and a temperature of from 40°–130° C.

2. The process of claim 1 in which the aqueous cyanamide solution (a) contains from 25 to 50 wt % cyanamide.

3. The process of claim 1 in which dehydrating is carried out at a pressure below 50 mbar.

4. The process of claim 1 in which dehydrating is carried out at a pressure below 30 mbar.

5. The process of claim 1 in which the mixture is dehydrated until the mixture has a residual water content of no more than 1 wt %.

6. The process of claim 1 in which the polyol (b) has a molecular weight of from 400 to 12,000.

7. The process of claim 6 in which the polyol (b) is a polyether polyol and/or polyester polyol.

8. The process of claim 1 in which the polyol (b) is a mixture of
   (1) at least one polyol having a molecular weight of from 400 to 12,000 and
   (2) at least one polyol having a molecular weight of from 62 to 399.

9. The process of claim 8 in which the polyol (b)(1) is a polyether polyol and/or polyester polyol.

10. The process of claim 9 in which polyol (b)(2) is ethylene glycol and/or 1,4-butanediol.

11. The process of claim 8 in which polyol (b)(2) is not completely miscible with polyol (b)(1).

12. The process of claim 8 in which polyol (b)(2) is ethylene glycol and/or 1,4-butanediol.

13. The process of claim 1 in which dehydrating is carried out at a pressure less than 30 mbar and a temperature less than 85° C.

14. A homogeneous, monophasically storage stable solution of cyanamide in a polyol containing from 0.1 to 50 wt % monomeric cyanamide (based on the solution) which is the dehydration product of a mixture of (a) an aqueous cyanamide solution containing from 10 to 55 wt % cyanamide and (b) at least one polyol having a molecular weight of from 62 to 12,000 at a pressure below 100 mbar and a temperature of from 40°–130° C.

15. The cyanamide in polyol solution of claim 14 containing no more than 1 wt % water.

16. The cyanamide in polyol solution of claim 14 in which the polyol is a mixture of (1) at least one polyol having a molecular weight of from 400 to 12,000 and (2) at least one polyol having a molecular weight of from 62 to 399.

17. The cyanamide in polyol solution of claim 16 in which the polyol mixture contains from 0.5 to 15 mol of polyol (2) for each mol of polyol (1).

18. The cyanamide in polyol solution of claim 16 in which the polyol (1) is not completely miscible with the polyol (2).

19. The cyanamide in polyol solution of claim 14 containing from 0.1 to 4.9 wt % cyanamide.

20. A process for the production of a polyurethane comprising reacting the cyanamide in polyol solution of claim 14 with an isocyanate.

* * * * *